United States Patent Office 2,721,351
Patented Oct. 25, 1955

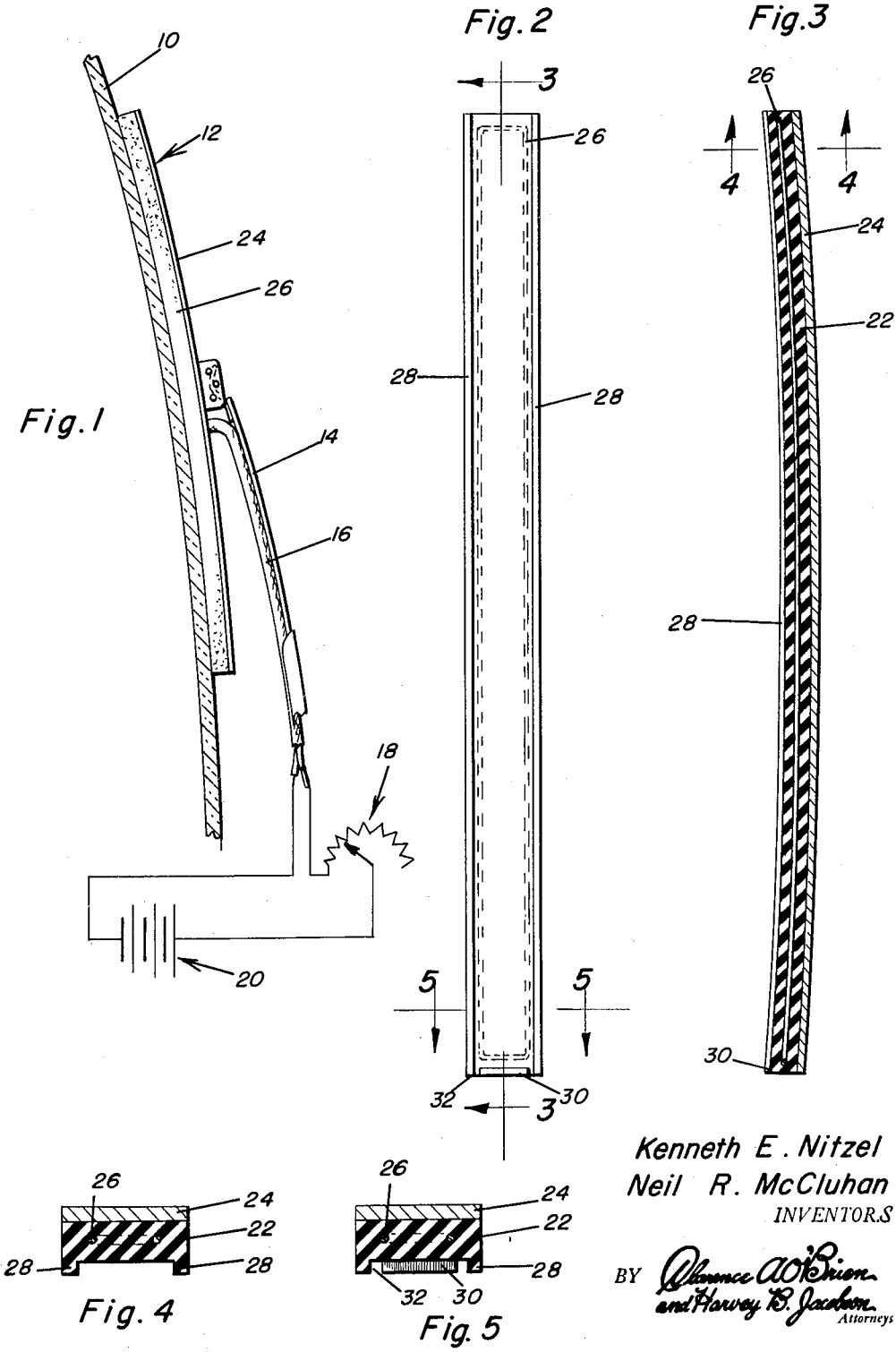

2,721,351

HEATED WIPER BLADE

Kenneth E. Nitzel, Homer, and Neil R. McCluhan,
Winnebago, Nebr.

Application August 14, 1953, Serial No. 374,295

4 Claims. (Cl. 15—250.5)

This invention relates to an improved heater wiper blade and more specifically provides heating wires embedded in the wiper blade and a novel wiper blade for efficient removal of snow or ice from the windshield of a vehicle.

An object of this invention is to provide a novel wiper blade having a heating element embedded therein with a rheostat for regulating the temperature of the heating element.

An important object of this invention is to provide a heated wiper blade having novel windshield engaging edges and further provided with a resilient base for maintaining the blade in snug contact with the curved windshield of a vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmental vertical section showing details of the relationship of the windshield, wiper blade, wiper arm, and a diagrammatic showing of the electrical circuit for the heated blade;

Figure 2 is a side elevation of the windshield engaging side of the blade showing the heating wires in phantom;

Figure 3 is a fragmental vertical longitudinal section taken substantially along section line 3—3 of Figure 2 showing details of the wiper edges, heating wires, and resilient base for the blade;

Figure 4 is a transverse section, top plane view taken substantially along section line 4—4 of Figure 3 showing details of the wiper edges; and Figure 5 is a transverse top plan section taken substantially along line 5—5 in Figure 1 showing details of the lower end of the wiper blades edges including a transverse rib between the edges.

Referring now more specifically to Figure 1 of the drawing, it will be seen that the numeral 10 designates a curved windshield of a vehicle and the numeral 12 designates a wiper arm in engagement with the windshield 10 and the numeral 14 designates a wiper arm for moving the blade 12 over the windshield 10. It further will be seen in Figure 1 that the wiper blade 12 has an electric wire 16 connected thereto and a rheostat 18 is connected between the wire 16 and a source of energy 20.

Referring now more specifically to Figures 2 and 3 of the drawings, it will be seen that the wiper blade 12 has a body portion 22 made of a rubber-like material such as neoprene and a metal resilient backing plate 24 which acts as a base for the body portion 22 and maintains it in a preselected curved configuration. A heating wire 26 is embedded in the body 22 and is connected to the electrical wire 16. As best seen in Figure 4 the body portion 22 has a projecting edge 28 along each longitudinal side. The projecting edges 28 form windshield engaging ribs which space the main body portion 22 away from the windshield 10. As seen in Figure 2 it will be seen that the space between the projecting edges 28 at the upper end of the blade is open and the space between the projecting edges 28 at the lower portion of the blade is partially closed by a transverse rib 30. As clearly seen in Figure 5 the transverse rib 30 is spaced from each of the projecting edges 28 for a purpose to be described hereinafter.

As best seen in Figure 2, it will be noted that the heating wires 26 are located between the projecting edges 28 and as a transverse rib acts as a partial closure extending between the projecting edges 28, melted snow or ice in the form of water will accumulate between the projecting edges 28 and the windshield and under the influence of the heating wires such water will be heated and acts as a melting agent thereby improving the efficiency of the device. It will be noted that such water will drain gradually from the space between the blade and the windshield through openings 32 provided by the transverse rib 30. Further, when the blade is in a horizontal or inoperative position any water remaining between the projecting edges will run out of the open end of the blade.

When the windshield 10 of the vehicle is covered with ice and snow, the vehicle operator will actuate the rheostat 18 which will supply electric energy through the conduit 16 to the heating element 26 from a source of energy 20. As the heating wire 26 gets hot any snow or ice under the blade will be melted and as the body 22 as well as the melting water is spread over the windshield 10 by the action of the arm 16 thereby clearing the windshield of snow and ice in an efficient manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A heated windshield wiper blade comprising an elongated resilient body, a heating element in said body, projection edges on said body adapted to engage a windshield, means supplying electrical energy to said heating element, said projecting edges forming wiping ribs, said edges being open at their upper end and partially closed at their lower end by a transverse rib rigid with said body whereby melted ice will be retained as water between the edges and when heated will act as a melting agent.

2. The structure as defined in claim 1 wherein said transverse rib between the projecting edges is spaced from said edges to permit gradual draining of the melting water.

3. The structures as defined in claim 2 wherein said body is provided with a resilient backing member for maintaining said projecting edges in intimate contact with a windshield.

4. A heated windshield wiper blade comprising an elongated body of resilient material, an elongated heating element embedded in said body, an elongated projecting flexible rib at each edge of one side of said body, said ribs being parallel and spaced from each other, and a transverse rib positioned at one end of the body and terminating in spaced relation to the elongated ribs, said body normally moving in a substantially vertical plane with the transverse rib positioned at the bottom end of the body for retaining water between the elongated ribs to act as a heat transferring agent for melting ice positioned on a windshield, said space between the ends of the transverse rib and the elongated ribs permitting the water to be gradually drained from the space between the elongated ribs.

References Cited in the file of this patent

UNITED STATES PATENTS

| | | |
|---|---|---|
| 1,657,916 | Curtis | Jan. 31, 1928 |
| 1,947,013 | Lauchin | Feb. 13, 1934 |
| 2,084,112 | Shannon | June 15, 1937 |
| 2,656,448 | Lentz | Oct. 20, 1953 |